US010033705B2

(12) United States Patent
Heer et al.

(10) Patent No.: US 10,033,705 B2
(45) Date of Patent: Jul. 24, 2018

(54) PROCESS FOR THE USER-RELATED ANSWERING OF CUSTOMER INQUIRIES IN DATA NETWORKS

(71) Applicant: zeotap GmbH, Berlin (DE)

(72) Inventors: Daniel Heer, Berlin (DE); Jannik Podlesny, Berlin (DE)

(73) Assignee: zeotap GmbH, Berlin (DE)

(*) Notice: Subject to any disclaimer, the term of this patent is extended or adjusted under 35 U.S.C. 154(b) by 116 days.

(21) Appl. No.: 14/957,687

(22) Filed: Dec. 3, 2015

(65) Prior Publication Data

US 2016/0164847 A1 Jun. 9, 2016

(30) Foreign Application Priority Data

Dec. 3, 2014 (DE) .................. 10 2014 117 796

(51) Int. Cl.
H04L 9/32 (2006.01)
H04L 29/06 (2006.01)
H04W 4/21 (2018.01)
G06F 17/30 (2006.01)
G06Q 30/00 (2012.01)
H04L 29/12 (2006.01)
H04W 12/12 (2009.01)
H04L 29/08 (2006.01)
H04M 3/00 (2006.01)
(Continued)

(52) U.S. Cl.
CPC .... H04L 63/0428 (2013.01); G06F 17/30365 (2013.01); G06F 17/30368 (2013.01); G06Q 30/016 (2013.01); H04L 61/308 (2013.01); H04L 67/20 (2013.01); H04L 67/306 (2013.01); H04M 3/00 (2013.01); H04W 4/206 (2013.01); H04W 4/21 (2018.02); H04W 12/02 (2013.01); H04W 12/12 (2013.01); H04L 61/6054 (2013.01)

(58) Field of Classification Search
None
See application file for complete search history.

(56) References Cited

U.S. PATENT DOCUMENTS 6,496,931 B1  12/2002  Rajchel et al.
8,661,547 B1 * 2/2014  Kononov .............. G06F 21/577
                                                          713/176
(Continued)

FOREIGN PATENT DOCUMENTS

DE        399 02 620 T2   4/2003
DE   20 2008 018 096 U1  10/2011

Primary Examiner — Kambiz Zand
Assistant Examiner — Arezoo Sherkat
(74) Attorney, Agent, or Firm — Collard & Roe, P.C.

(57) ABSTRACT

A process for the processing of user inquiries in a data network saves user data anonymized at first in an independent process with an independent third-party vendor, which can then be accessed by the use of several incremental encryption and anonymization routines in such a way that, on the one hand the provider is not involved in the data exchange and in other respects even the independent third-party vendor does not have access to the user data at any time, albeit with the result that anonymized customer data, especially information about age, sex and partial postal code, can be kept ready in a database for the mobile end device being used.

14 Claims, 1 Drawing Sheet

(51) Int. Cl.
*H04W 4/20* (2018.01)
*H04W 12/02* (2009.01)

(56) References Cited

U.S. PATENT DOCUMENTS

| | | | |
|---|---|---|---|
| 2008/0040225 A1* | 2/2008 | Roker | G06Q 30/02 |
| | | | 705/14.66 |
| 2011/0010563 A1 | 1/2011 | Lee et al. | |
| 2012/0311035 A1 | 12/2012 | Guha et al. | |
| 2014/0201007 A1* | 7/2014 | Stack | G06Q 10/10 |
| | | | 705/14.66 |

* cited by examiner

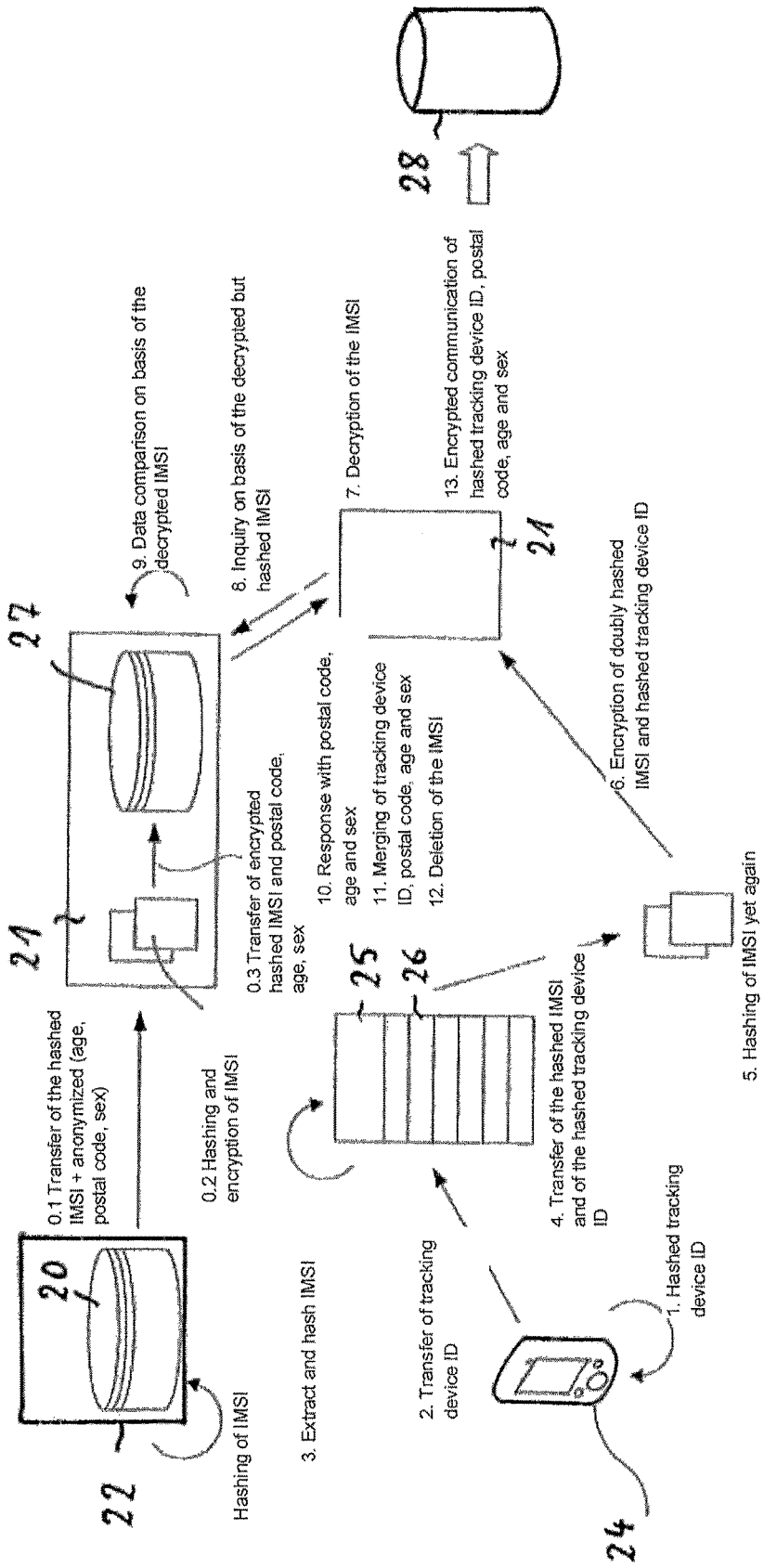

PROCESS FOR THE USER-RELATED ANSWERING OF CUSTOMER INQUIRIES IN DATA NETWORKS

CROSS REFERENCE TO RELATED APPLICATIONS

Applicant claims priority under 35 U.S.C. § 119 of German Application No. 10 2014 117 796.7 filed Dec. 3, 2014, the disclosure of which is incorporated by reference.

BACKGROUND OF THE INVENTION

1. Field of the Invention

The invention relates to a process for the user-related answering of customer inquiries in data networks. In desktop operation this is already possible by the fact that many websites work with so-called cookies, i.e. a file for temporary archiving of information, which as the case may be permit inferences about the user. Hereby, however, only indirect conclusions about the person of the user are possible, for example by the evaluation of the behavior of the user.

2. Description of the Related Art

A comparable technology exists in the so-called mobile Internet, which is used by the customers via mobile radio end devices, i.e. especially by smartphones, and which if used at all, is available to only a very limited extent. Although data about the user are usually in the possession of the mobile radio provider, the transmittal or processing of these data is not permissible for reasons of data protection. A transmittal of these data is then possible if the transmittal of these data takes place in exclusively anonymized form and an access to the clear text data of the user is not possible under any circumstances.

SUMMARY OF THE INVENTION

The task of the invention is therefore to provide a process permissible according to data protection law that makes it possible to evaluate anonymized customer data. In this way third-party vendors will be put into the position to undertake a customer-specific answering of customer inquiries and/or to present advertising in selective, customer-specific manner.

This task is accomplished by a process with the features according to the invention. Advantageous improvements of the invention are set forth below.

According to the invention, this task is accomplished by the installation of a so-called matching request. In connection with this matching request, the call to a mobile website or the start of a special app is used by a mobile end device to recognize the tracking device ID of the mobile end device or alternatively to allocate a quasi device ID to the inquiring device. This tracking device ID or quasi device ID is supplemented with the help of the responsible provider or mobile radio provider by the so-called IMSI, i.e. by the respective SIM card number of the respective mobile end device. Alternatively, a comparable ID can be used for the identification of the user. Independently thereof, in an upstream, decoupled process, the customer data records of the provider or mobile radio provider, encrypted in anonymized form, for example comprising age, sex and the first three digits of the postal code of the customer's domicile, were filed in combination with the IMSI or another ID in a separate database, preferably by an independent third-party vendor. Furthermore, these anonymized customer data can then be merged with the anonymized tracking device ID or quasi device ID in the course of the matching request and saved in combination with one another in a further database. These data are then ready for the call, for example by customers, in order to check whether an advertising offer could be of interest precisely for the user of the respective mobile end device. In order to keep the data current, it may be practical to repeat the matching request explained in the foregoing from time to time.

The correspondingly processed user inquiry can then be answered in person-related manner by the operator or provider of the (mobile) website or app called by the user, without disclosing the actual identity of the inquiring customer to the website provider.

In advantageous configuration, the matching request can be initialized at predetermined time intervals by means of a software installed on the mobile end device.

In Specific configuration of the invention, the anonymization of the tracking device ID or quasi device ID takes place by a hash routine.

The anonymization of the IMSI or of another ID also takes place by means of a hash routine.

In a further step for the anonymization of the customer data, the hashed IMSI or ID hashed in other manner is then additionally encrypted by means of an asymmetric routine.

In the already mentioned decoupled process for the saving of selected user data, preferably by an independent third-party vendor, a selected part of the customer data in the possession of the provider, especially the anonymized customer data, preferably comprising age, sex and the first three digits of the postal code, in combination with an anonymized IMSI or other ID, are first communicated by a provider, wherein the IMSI or ID are likewise anonymized by a hash routine.

Finally these anonymized and encrypted user data generated from the selected user data delivered by the provider are saved in a database, preferably of the third-party vendor. In some mobile end devices, especially smartphones, the tracking device ID is already anonymized, i.e. hashed, on the device side. In these cases the process according to the invention does not have to anonymize, once again, the tracking device ID communicated by the end devices of the respective mobile radio customer. In this case the further process runs by using the anonymized tracking device ID predetermined on the device side.

In the already mentioned upstream decoupled process, the IMSI or another ID of the user are first encrypted by means of a first hash routine and in combination with the anonymized customer data are communicated to the preferably independent third-party vendor or other operator of a database, which then hashes, once again, the already hashed IMSI or ID hashed in other manner by means of a second secret hash routine and then encrypts it by means of an asymmetric routine and then files it in a database.

In a last step of the matching request, the tracking device ID or quasi device ID are then merged with the anonymized customer data in a further database and in a last step the corresponding IMSI or other ID are irreversibly deleted.

Then these data, i.e. the tracking device ID or quasi device ID, in combination with the anonymized customer data, are ready for calling. They can be reported directly on request or else indirectly in the form of a score, i.e. the value of the degree of agreement of the customer attributes with a certain product or on a defined service.

BRIEF DESCRIPTION OF THE DRAWINGS

The invention will be explained hereinafter on the basis of an exemplary embodiment illustrated in more detail in the drawing:

The sole FIGURE shows, in a process flow diagram, a preferred sequence of the process according to the invention for the processing of user inquiries.

DETAILED DESCRIPTION OF PREFERRED EMBODIMENTS

Independently of the process to be explained hereinafter for the processing of user inquiries, the process considered here as exemplary first requires in advance a cooperation of an independent third-party vendor (21) with a provider (22) for the compliance with requirements of data protection law. On the basis of other statutory requirements, the process can also be realized without the intermediary of an independent third-party vendor.

Furthermore, it is required in advance that the provider (22) maintain a user database (20), wherein, among other possibilities, the user data are indexed by the SIM cards acquired by the respective user from the respective provider (22), wherein the SIM cards are indexed in turn by the SIM card number, the so-called IMSI. The customer data comprise, among other possibilities, information about the address, the sex and the age of the customers in question as well as an entire series of further data such as, for example, his or her bank relationship, the complete name, etc. On the basis of the cooperation of the provider (22) with the independent third-party vendor (21), the provider (22) communicates, in a data transfer 0.1, a defined selection of the user data, in this case age, the first three digits of the postal code and the sex of the user, in combination with an IMSI encrypted by a hash routine, so that under no circumstances is recourse to the user data possible on the basis of these data or else a special user cannot be identified by the third-party vendor (21) on the basis of these data.

The third-party vendor (21) in turn hashes and encrypts the IMSIs of all user data records obtained in this way in a step 02. By the route of a data transfer 0.3, this hashed and encrypted IMSI is then filed, in combination with the likewise anonymized user data, comprising the age, the sex and the first three digits of the postal code of the customer, in an independent database (27) of the third-party vendor (21) and kept in readiness there.

If a user, independently of the decoupled process described in the foregoing, now calls a mobile website or app with his or her mobile end device (24) in the course of the so-called matching request, this inquiry is forwarded to a defined gateway (25), to which a server (26) of the third-party vendor (21) is connected, and, in fact in combination with the device code of the mobile end device, the so-called tracking device ID. For the case that the tracking device ID is not already output in encrypted form by the end device (24), the tracking device ID is first hashed in a step 1 by means of the server (26) connected to the gateway (25) and then a data transfer of the inquiry of the user is communicated in combination with the encrypted tracking device ID in a step 2. By means of the server (26), the SIM card number, i.e. the so-called IMSI, is then extracted from the data packet that contains the encrypted tracking device ID and is encrypted by means of a hash routine (step 3). Such an extraction can take place, for example, via the normal billing process of a data provider. At the same time, a relationship of the customer with the individual data packet is established in order to bill him or her.

In a further data transfer (step 4), the hashed IMSI, in combination with the hashed tracking device ID, is then transmitted to a further process of the server (26), in the course of which the communicated IMSI is then hashed yet one more time in a further hash routine (step 5).

In a further processing step (step 6), both the doubly hashed IMSI and the hashed tracking device ID are then encrypted yet one more time by means of an asymmetric encryption routine and then these data are transmitted to the third-party vendor (21) for further processing. The third-party vendor (21) then decrypts the IMSI (step 7) on the basis of the key known to it. On the basis of the IMSI now existing in decrypted but hashed form, an inquiry is then started (step 8) in the database (27) of the third-party vendor (21).

On the basis of the decrypted but hashed IMSI a data comparison can then be made in the database (27) of the third-party vendor (21), wherein at the same time the anonymized user data can be identified (step 9) on the basis of the decrypted IMSI in the database (27).

From this database (27), the anonymized user data, comprising the first three digits of the postal code, the age and the sex of the user, can then be accordingly retrieved (step 10) and then linked with the existing tracking device ID (step 11). These data are then filed in combination with one another in a further database (28). The IMSI, which is then no longer needed, is then irreversibly deleted (step 12) on the part of the third-party vendor (21). The hashed tracking device ID can then either be communicated directly in combination with the user inquiry to the provider of the mobile website or app or first to a fourth-party vendor, which then forwards these data to a provider, i.e. for example the operator of the website called by the user (step 13).

Alternatively, instead of the user data described in detail by way of example in the foregoing, it would also be possible, by evaluation of the data of the further database (28), to calculate a score determined on the basis of these data, i.e. for example a value from 1-100, which indicates how well a particular offer based on these user data matches the respective user.

In the foregoing, therefore, a process for enhancement of user inquiries by anonymized, person-related data has been described which permits the provider of mobile websites or apps to answer user inquiries in customer-specific manner, but in such a way that the actual user identity is not disclosed to any of the parties involved at any time, or that it could be determined only by complex processes. The process described in the foregoing therefore satisfies the requirements of data protection law, since none of the parties involved, especially therefore the described third-party or fourth-party vendors, comes into possession of person-relevant data at any time and conversely the processing and answering of user inquiries take place in a way completely decoupled from the mobile radio provider (22), which therefore cannot make inferences of any kind about the behavior of the user.

REFERENCE SYMBOL LIST

01 Data transfer of the hashed IMSI and anonymized customer data
02 Hashing and encryption of the IMSI
03 Transfer of encrypted hashed IMSI and anonymized customer data
1 Hashing of the tracking device ID
2 Data transfer of the hashed tracking device ID
3 Extraction of the IMSI via the data packet that contains the tracking device ID and the subsequent hashing of the IMSI 4 Data transfer of the hashed IMSI and of the hashed tracking device ID
5 Further hashing of the already hashed IMSI
6 Encryption of the doubly hashed IMSI and of the hashed tracking device ID
7 Decryption of the IMSI (which remain hashed)
8 Database inquiry on the basis of the decrypted but hashed IMSI
9 Data comparison on the basis of the decrypted but hashed IMSI
10 Retrieval of the anonymized user data from the database of the third-party vendor
11 Merging of the tracking device with the anonymized user data
12 Deletion of the anonymized IMSI by the third-party vendor
13 Encrypted communication of the hashed tracking device ID in combination with the anonymized customer data
20 User database of the provider
21 Independent third-party vendor
22 Provider
24 Mobile end device
25 Gateway
26 Server
27 Database of the third-party vendor
28 Further database

What is claimed is:

1. A process for a user-related answering of customer inquiries in data networks, the process comprising steps of:
   integrating a software module within a mobile network,
   communicating, via the software module, a first request to a server address within a data network of a first provider when a user uses the software module via an end device, wherein the first request comprises a data packet comprising a device ID of the end device,
   anonymizing the device ID in that a hash routine is performed on the device ID to form an anonymized device ID,
   determining an ID for identification of the user in that the first provider extracts the ID from the data packet, the first provider being associated with the server address,
   anonymizing the ID via an independent third-party provider performing a third-party hash routine on the ID to form an anonymized ID,
   encrypting the anonymized ID via the independent third-party provider performing an asymmetric encryption routine on the anonymized ID to form an encrypted ID,
   then, via a server associated with the server address, supplementing the first request by the encrypted ID to form a supplemented data packet,
   performing an upstream process independent and decoupled from the first request, the upstream process comprising:
      performing a first upstream hash routine on IDs of inquiring users to form hashed upstream IDs,
      communicating, via the first provider, upstream customer data records to the independent third-party vendor, the upstream customer data records comprising the hashed upstream IDs in combination with anonymized customer data, the first provider being responsible for the end device,
      then further hashing, via the independent third-party vendor, the upstream customer data records including the hashed upstream IDs to form further anonymized upstream customer data records including doubly hashed upstream IDs,
      encrypting the further anonymized upstream customer data records including the doubly hashed upstream IDs via the independent third-party vendor using a key to perform an upstream asymmetric encryption routine on the further anonymized upstream customer data records and on the doubly hashed upstream IDs to form encrypted upstream customer data records including the encrypted doubly hashed upstream IDs,
      decrypting, via the independent third-party provider using the key, the encrypted doubly hashed upstream IDs to form doubly hashed unencrypted upstream IDs,
      encrypting, via the independent third-party provider using a second key, the doubly hashed unencrypted upstream IDs to form reencrypted, doubly hashed upstream IDs, and
      filing and saving the encrypted upstream customer data records and the reencrypted, doubly hashed upstream IDs in a database to form filed encrypted upstream customer data records and filed reencrypted, doubly hashed upstream IDs, the database belonging to the server associated with the server address
   then, identifying, via the server, a filed encrypted customer data record of the filed encrypted upstream customer data records and identifying a filed reencrypted, doubly hashed customer ID of the filed reencrypted, doubly hashed upstream IDs from the database, in connection with the first request of the user, on a basis of the encrypted ID provided at the server, to form identified customer data records and an identified reencrypted customer ID,
   retrieving, via the server, the identified customer data records and the identified reencrypted customer ID from the database to form retrieved customer data records and a retrieved reencrypted customer ID, respectively,
   merging, via the server, the retrieved customer data records and the retrieved reencrypted customer ID with the anonymized device ID of the supplemented data packet to form merged customer data,
   combining the merged customer data with user access information to form combined customer data, the user access information comprising a record of the user using the software module,
   irreversibly deleting from the server the ID from the data packet, the anonymized ID, and the encrypted ID, and
   communicating the combined customer data to a second provider, the second provider providing the software module and/or
   saving the combined customer data in a further database for processing of future inquiries.

2. The process according to claim 1, wherein the combined customer data is saved in a further database for processing of future inquiries,
   wherein the process further comprises steps of:
   submitting, via a further mobile end device, a further request comprising a further device ID, and
   accessing from the further database a data record corresponding to the further device ID.

3. The process according to claim 1, wherein the software module is integrated within a mobile application of software of the end device,
   wherein the user uses the software module by using the mobile application on the end device to visit the mobile website, and wherein the mobile application on the user end device initializes the first request to the server address.

4. The process according to claim 3, further comprising a step of:
as a part of the upstream process, forming the anonymized customer data via the independent third party vendor performing a profile data hash routine on customer data.

5. The process according to claim 1, wherein the combined customer data is saved in a further database as saved combined customer data for processing of future inquiries, and
wherein the process further comprises a step of:
when the further database receives a future request, automatically communicating the retrieved customer data records of the saved combined customer data in combination with the anonymized device ID of the saved combined customer data.

6. The process according to claim 1, wherein the ID extracted from the data packet comprises an IMSI of the end device, and
wherein the IDs in the upstream process respectively comprise IMSIs of customers.

7. The process according to claim 1, wherein the anonymized customer data in the upstream process comprises age, sex, and first three digits of a postal code of customers.

8. The process according to claim 1, wherein the combined customer data is saved in a further database for processing of future inquiries to form saved combined customer data, and
wherein the process further comprises a step of:
when the further database receives an inquiry from a further Internet provider, automatically communicating the retrieved customer data records of the saved combined customer data in combination with the anonymized device ID of the saved combined customer data as a score.

9. The process according to claim 8, wherein the inquiry from the further Internet provider comprises a specific offer, and
wherein the score comprises a degree of agreement of the retrieved customer data records with the specific offer.

10. The process according to claim 1, wherein the software module is integrated within a website of the second provider,
wherein the user uses the software module by using the end device to visit the website of the second provider, and
wherein the website of the second provider initializes the first request to the server address.

11. The process according to claim 1, wherein the device ID is a tracking device ID.

12. The process according to claim 1, wherein the device ID is a quasi device ID.

13. The process according to claim 3, wherein the anonymizing of the device ID occurs via the mobile application on the end device performing the hash routine to form the anonymized device ID.

14. The process according to claim 10, wherein the anonymizing of the device ID occurs via the server associated with the server address performing the hash routine to form the anonymized device ID.

* * * * *